United States Patent
Zhang et al.

(10) Patent No.: US 11,740,748 B2
(45) Date of Patent: Aug. 29, 2023

(54) TOUCH MODULE AND DISPLAY DEVICE

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventors: Guiyu Zhang, Beijing (CN); Hongqiang Luo, Beijing (CN); KwangGyun Jang, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 234 days.

(21) Appl. No.: 17/416,552

(22) PCT Filed: Dec. 29, 2020

(86) PCT No.: PCT/CN2020/140775
§ 371 (c)(1),
(2) Date: Jun. 21, 2021

(87) PCT Pub. No.: WO2021/184903
PCT Pub. Date: Sep. 23, 2021

(65) Prior Publication Data
US 2022/0326808 A1  Oct. 13, 2022

(30) Foreign Application Priority Data
Mar. 19, 2020  (CN) .................. 202010194591.6

(51) Int. Cl.
*G06F 3/044* (2006.01)
*G06F 3/041* (2006.01)

(52) U.S. Cl.
CPC .......... *G06F 3/0446* (2019.05); *G06F 3/0412* (2013.01); *G06F 3/0443* (2019.05); *G06F 2203/04111* (2013.01)

(58) Field of Classification Search
CPC ......... G06F 2203/04111; G06F 3/0412; G06F 3/0443; G06F 3/0446
See application file for complete search history.

(56) References Cited

U.S. PATENT DOCUMENTS 9,817,529 B2   11/2017   Bae et al.
9,851,855 B2   12/2017   Bok
(Continued)

FOREIGN PATENT DOCUMENTS

CN   204667361   9/2015
CN   105760010   7/2016
(Continued)

OTHER PUBLICATIONS

International Search Report from PCT/CN2020/140775 dated Feb. 25, 2021.
(Continued)

*Primary Examiner* — Robin J Mishler
(74) *Attorney, Agent, or Firm* — Calfee, Halter & Griswold LLP

(57) ABSTRACT

A touch module comprises a substrate and at least one group of touch patterns formed on one side of the substrate, wherein each group of the touch patterns comprises a conductive bridge, an insulating support portion, and a touch electrode portion. The touch module has good bending capacity.

20 Claims, 5 Drawing Sheets

(56) References Cited

U.S. PATENT DOCUMENTS

| | | |
|---|---|---|
| 2016/0195984 A1 | 7/2016 | Bok |
| 2016/0202827 A1 | 7/2016 | Bae et al. |
| 2019/0165327 A1* | 5/2019 | Ye .................... H10K 50/844 |
| 2019/0179441 A1 | 6/2019 | Moon |

FOREIGN PATENT DOCUMENTS

| | | |
|---|---|---|
| CN | 106919290 | 7/2017 |
| CN | 108052221 | 5/2018 |
| CN | 109460162 | 3/2019 |
| CN | 110007802 | 7/2019 |
| CN | 106919290 | 1/2020 |
| CN | 110658951 | 1/2020 |
| CN | 111324238 | 6/2020 |
| KR | 20150058629 | 5/2015 |
| KR | 20180022085 | 3/2018 |
| KR | 102132631 | 7/2020 |
| WO | 2021184903 | 9/2021 |

OTHER PUBLICATIONS

Written Opinion from PCT/CN2020/140775 dated Feb. 25, 2021.
Office action from Chinese Application No. 202010194591.6 dated Feb. 20, 2021.
Allowance from Chinese Application No. 202010194591.6 dated May 8, 2021.

\* cited by examiner

TOUCH MODULE AND DISPLAY DEVICE

CROSS-REFERENCE TO RELATED APPLICATIONS

The present disclosure is the national stage entry of PCT/CN/2020/140775, filed on Dec. 29, 2020 which claims the priority of the Chinese patent application named "Touch Module and Display Device" with the application number 202010194591.6 filed on Mar. 19, 2020, and the entire contents of the both patent applications are incorporated herein by reference.

TECHNICAL FIELD

The present disclosure relates to the field of touch display technology, and in particular to a touch module and a display device.

BACKGROUND

As the AMOLED (Active-matrix organic light emitting diode) market becomes hotter and hotter, the market's pursuit of the structures and forms of AMOLED displays becomes more and more peculiar. The early 2D cover plate was changed to the 2.5D cover plate, and then to 3D cover plate, and the structural differentiation is more likely to be welcomed by consumers, so many end customers require increasing the bending angle of the binding area, for example, to 90° on the basis of 3D cover plate, which is undoubtedly a challenge to the fields of cover plate industry, display industry, laminating industry and so on.

In the process of attaching the touch display structure to the cover plate with a larger bending angle in the binding area, due to the poor bending ability of the touch module, the touch module is likely to break at the binding area, causing the touch function to fail.

It should be noted that the information of the disclosure in the background section above is only used to enhance the understanding of the background of the present disclosure, and therefore may include information that does not constitute the prior art known to those of ordinary skill in the art.

SUMMARY

An object of the present disclosure is to provide a touch module and a display device that have a good bending ability to ensure a good touch performance.

According to an aspect of the present disclosure, a touch module is provided and comprises a substrate and at least one group of touch patterns, each group of touch patterns comprising:

a conductive bridge, formed on one side of the substrate and having a plurality of bridging positions arranged at intervals in a first direction;

an insulating support portion, formed on the one side of the substrate and provided on the conductive bridge, wherein the insulating support portion comprises a plurality of first support portions arranged at intervals in the first direction, and a second support portion located between adjacent first support portions, and a first partition opening located between the first support portion and the second support portion; wherein each of the first support portions corresponds to one of the bridging positions, and the first supporting portion has a via hole exposing the bridging position;

a touch electrode portion, comprising a plurality of first touch electrodes arranged at intervals in the first direction and a second touch electrode which is located between adjacent first touch electrodes and is insulated from the first touch electrodes, wherein each of the first touch electrodes is formed on one of the first support portions and is electrically connected to the bridging position through the via hole, and each of the second touch electrodes is formed on the second support portion.

In an exemplary embodiment of the present disclosure, a contour line of an orthographic projection of the first touch electrode on the substrate is located inside a contour line of an orthographic projection of the first support portion on the substrate; and a contour line of an orthographic projection of the second touch electrode on the substrate is located inside a contour line of an orthographic projection of the second support portion on the substrate.

In an exemplary embodiment of the present disclosure, the orthographic projections of the first touch electrode and the second touch electrode on the substrate are in a grid shape; and the orthographic projections of the first support portion and the second support portion on the substrate are in a grid shape.

In an exemplary embodiment of the present disclosure, a line width of the grid lines in the first touch electrode and the second touch electrode is 1 μm to 10 μm.

In an exemplary embodiment of the present disclosure, the materials of the first touch electrode, the second touch electrode, and the conductive bridge are metal materials.

In an exemplary embodiment of the present disclosure, each group of touch patterns further comprises an insulating protection portion, and the insulating protection portion covers the touch electrode portion and the insulating support portion.

In an exemplary embodiment of the present disclosure, the material of the insulating protection part is an organic insulating material, and the material of the insulating support portion is an inorganic insulating material.

In an exemplary embodiment of the present disclosure, a plurality of conductive bridges are provided in each group of touch patterns, and the plurality of conductive bridges are arranged at intervals in the first direction, and each of the conductive bridges has two connection regions.

In an exemplary embodiment of the present disclosure, the touch patterns are provided in multiple groups, and the multiple groups of touch patterns are arranged in a second direction, and the second direction intersects the first direction; wherein, the plurality groups of touch patterns are disconnected from each other at a position between the corresponding first touch electrodes in the second direction; and the plurality groups of touch patterns are connected with each other at a position between the corresponding second touch electrodes in the second direction.

In an exemplary embodiment of the present disclosure, the plurality groups of touch patterns are disconnected from each other at a position between the corresponding first support portions in the second direction; and the plurality groups of touch patterns are connected with each other at a position between the corresponding second support portions in the second direction.

In an exemplary embodiment of the present disclosure, one of the first touch electrode and the second touch electrode is a transmitting electrode, and the other is a receiving electrode.

According to another aspect of the present disclosure, a display device is provided and comprises a display module and a touch module according to any one of the above, and a substrate of the touch module is formed on a display side of the display module.

The technical solution provided by the present disclosure may achieve the following beneficial effects.

In the touch module and the display device provided by the present disclosure, the insulating support portion is provided with a first partition opening, so that the internal stress generated by the insulating support portion can be released at the first partition opening during the bending process of the touch module so as to avoid excessive internal stress accumulation, which may alleviate the situation that the bridging position is broken due to the excessive internal stress of the insulating support, and then may ensure that the touch module still has a good touch performance in the bent state, and improves the yield of the touch module.

It should be understood that the above general description and the following detailed description are only exemplary and explanatory, and cannot limit the present disclosure.

BRIEF DESCRIPTION OF THE DRAWINGS

The drawings herein, which are incorporated into the specification and constitute a part of the specification, show embodiments consistent with the disclosure, and are used to explain the principle of the disclosure together with the specification. Apparently, the drawings in the following description only relate to some embodiments of the present disclosure. For those of ordinary skill in the art, other drawings can be obtained from these drawings without creative work.

Figure 1:
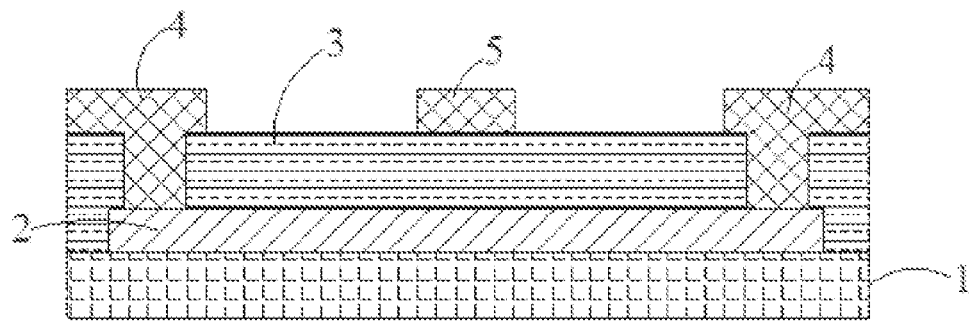
FIG. 1 shows a schematic cross-sectional view of a partial structure of a touch module described in the related art.

Reference signs in FIG. 1:

1: substrate; 2: conductive bridge; 3: insulating layer; 4: transmitting electrode; 5: receiving electrode;

Reference signs in FIGS. 2-6 and 8-10:

10: touch module; 101: substrate; 102: conductive bridge; 102a: bridging position; 103: first support portion; 104: second support portion; 105: first partition opening; 106: via hole; 107: first touch electrode; 108: second touch electrode; 109: second partition opening; 110: insulating protection portion; 111: filling portion; 11: display layer; 12: encapsulation layer; 13: polarizer; 14: cover plate; 15: flexible circuit board.

DETAILED DESCRIPTION

Example embodiments will now be described more fully with reference to the accompanying drawings. However, the example embodiments can be implemented in various forms, and should not be construed as being limited to the embodiments set forth herein; on the contrary, these embodiments are provided so that this disclosure will be comprehensive and complete, and fully convey the concept of the example embodiments to those of ordinary skill in the art. The same reference numerals in the figures represent the same or similar structures, and thus their detailed descriptions will be omitted.

In the related art, as shown in FIG. 1, the mutual-capacitive touch module may include at least a three-layer structure, such as: a substrate 1, a bridging layer, an insulating layer 3, and a touch electrode layer stacked in sequence; the touch electrode layer may include a transmitting (TX) electrode 4 and a receiving (RX) electrode 5. Each TX channel may include a plurality of TX electrodes 4 connected with each other, and each RX channel may include a plurality of RX electrodes 5 connected with each other, wherein a capacitor will be formed at the intersection of the RX channel and the TX channel. In order to avoid an electrical connection between the RX channel and the TX channel at the intersection, the RX electrodes 5 of the RX channel can be directly connected to each other at the touch electrode layer, and the TX electrodes 4 of the TX channel are connected to each other through a conductive bridge 102 of the bridging layer, so as to realize the insulation of the RX channel and the TX channel at the intersection. That is, the insulation of the RX channel and the TX channel at the intersection is realized through the setting of the insulating layer.

However, due to the limited bending ability of the insulating layer, when the touch module is bent, as the bending angle increases, the internal stress of the insulating layer will increase continuously, which makes the bridging position (i.e., a position for connecting the conductive bridge 2 and the touch electrode) easily broken, and then the problem of poor contact occurs, resulting in a decrease in touch performance. The touch module is not suitable to use in a display device that is bent at a wide angle.

Figure 2:
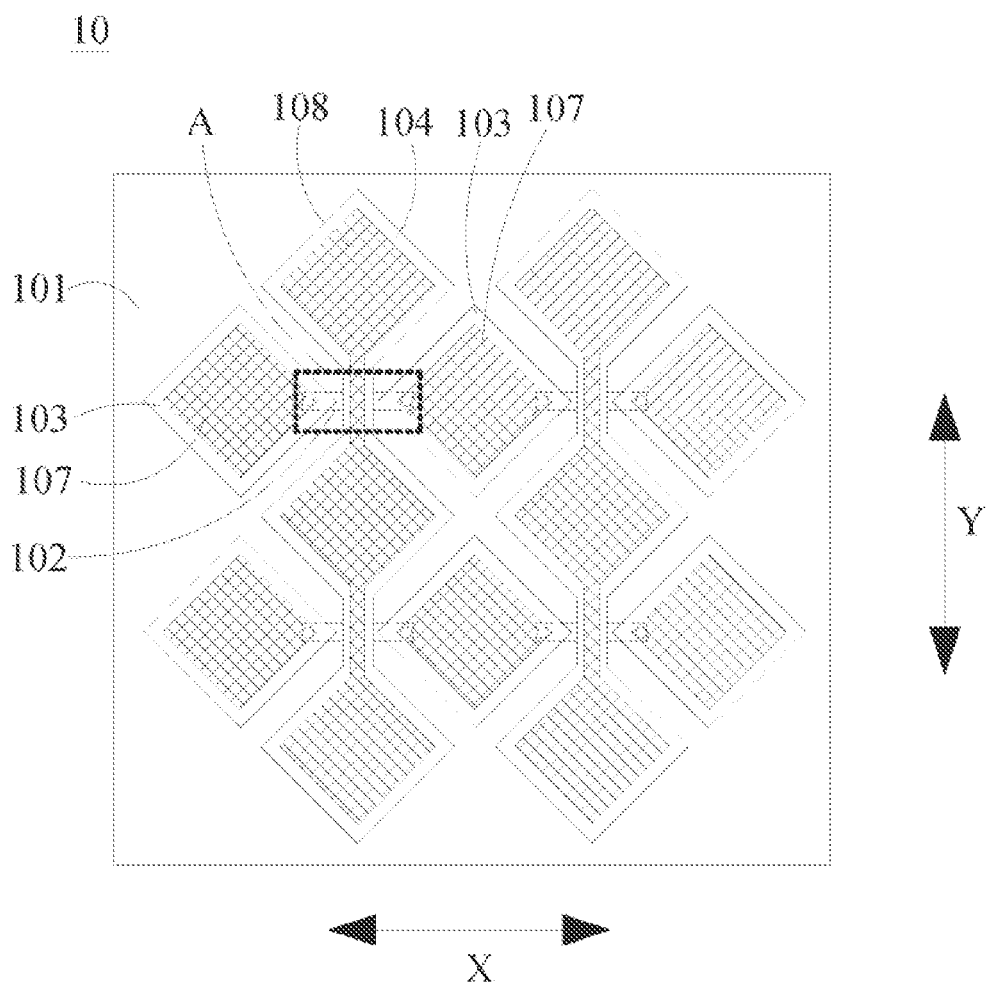
FIG. 2 shows a schematic top view of a touch module according to an embodiment of the present disclosure.
Figure 3:
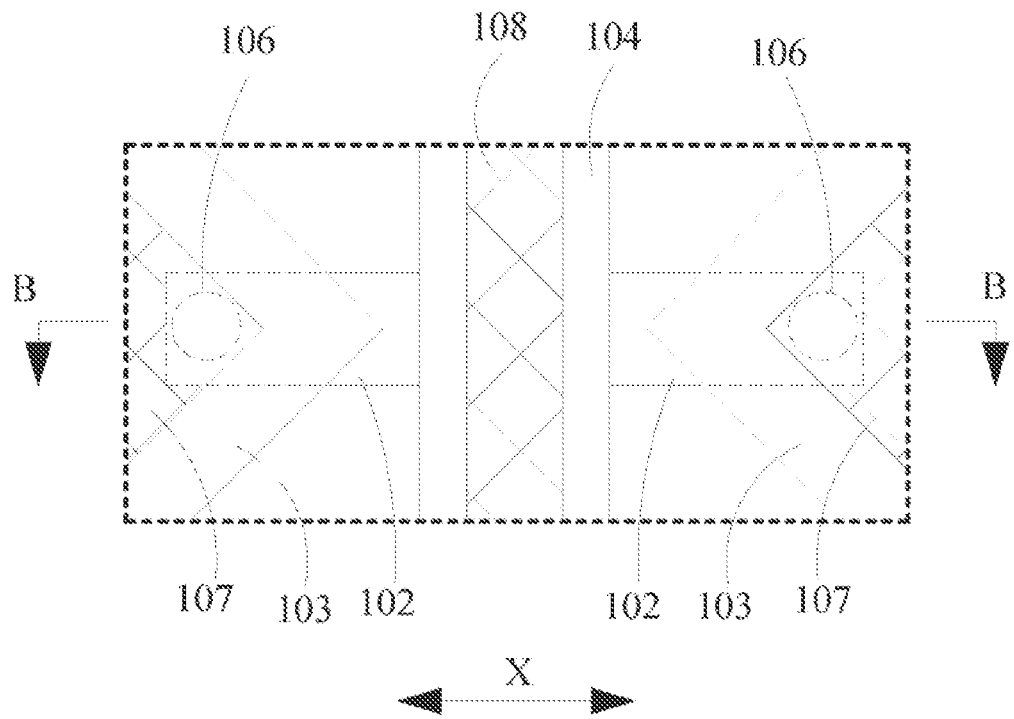
FIG. 3 shows an enlarged schematic diagram of part A shown in FIG. 2.
Figure 4:
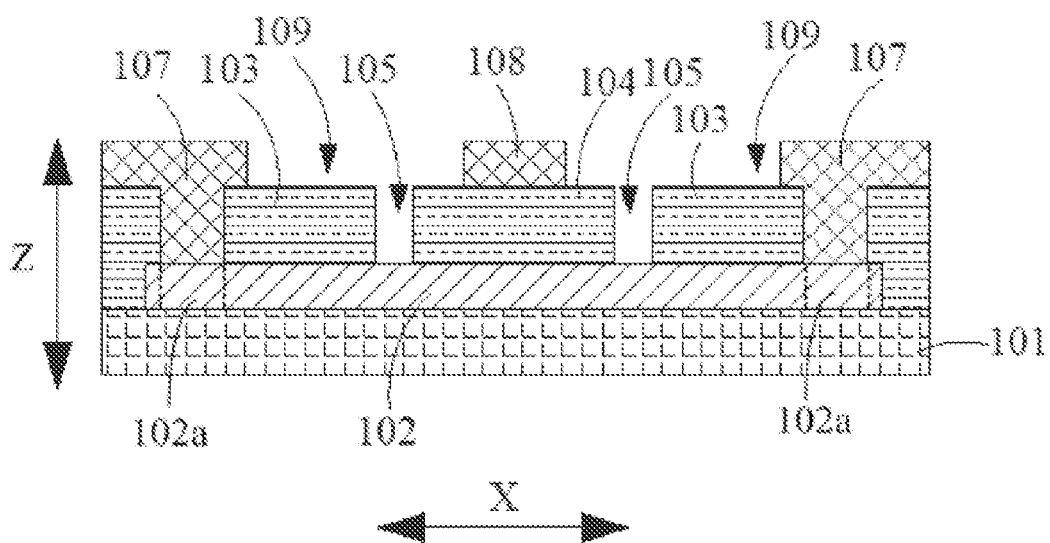
FIG. 4 shows a schematic cross-sectional view of the structure shown in FIG. 3 in the direction B-B.

In order to solve this problem, as shown in FIG. 2 to FIG. 4, embodiments of the present disclosure provide a touch module 10 that may include a substrate 101 and at least one group of touch patterns. The substrate 101 may be a single-layer structure or a multi-layer structure; the substrate 101 may be an inorganic insulating material, such as silicon oxide, silicon nitride, etc., but it is not limited thereto, depending on the specific situation. Each group of touch patterns may include a conductive bridge 102, an insulating support portion, and a touch electrode portion that are sequentially formed.

The conductive bridge 102 is formed on one side of the substrate 101, and has a plurality of bridging positions 102a arranged at intervals in a first direction X. The bridging position 102a refers to an area on the conductive bridge 2 contacting with a touch electrode (a first touch electrode 107 and a second touch electrode), that is, an area defined by two adjacent dashed lines on the conductive bridge 102 as shown in FIG. 4, FIG. 6, FIG. 9 and FIG. 10. It should be noted that the dashed lines shown on the conductive bridge 102 in FIG.

Figure 6:
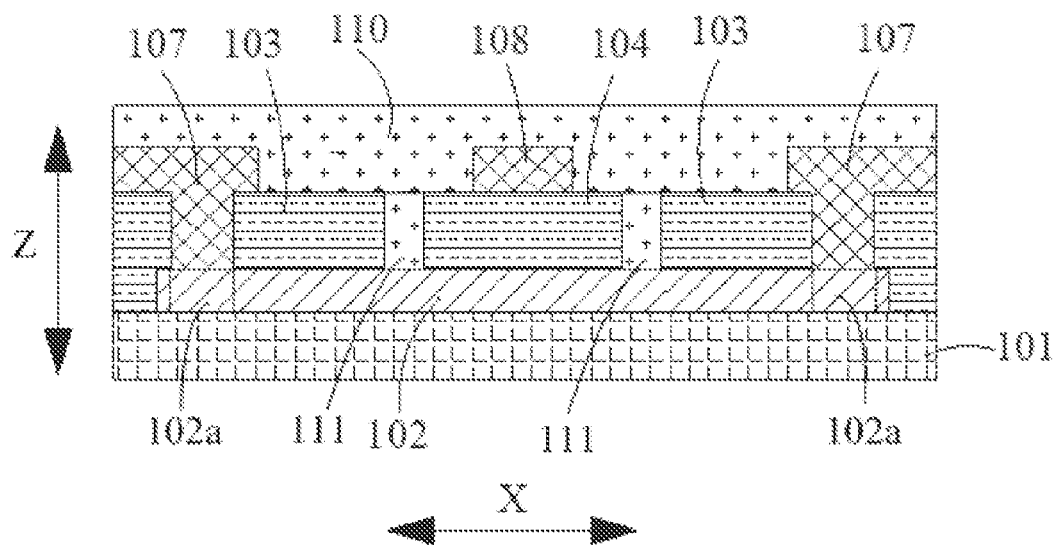
FIG. 6 shows a schematic cross-sectional view of a partial structure of a touch module according to another embodiment of the present disclosure.
Figure 9:
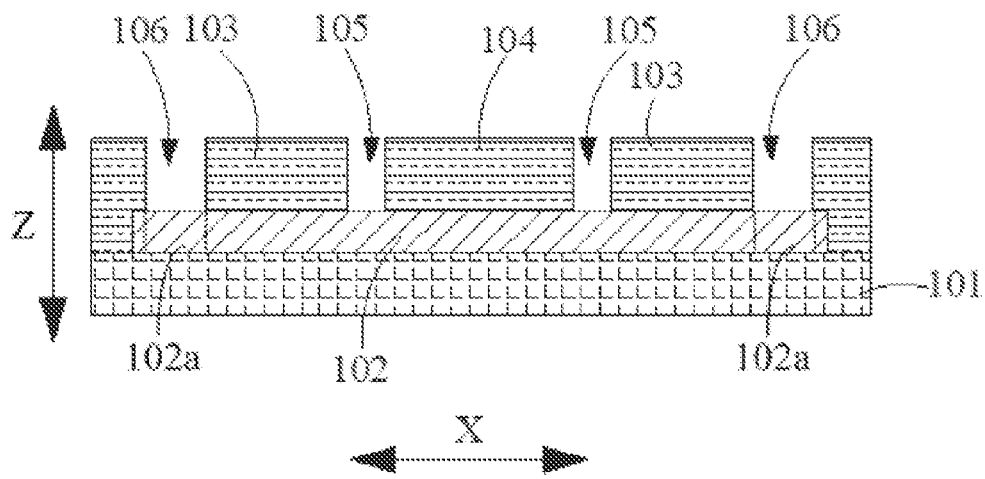
FIG. 9 shows a schematic structural diagram after step S108 is completed.
Figure 10:
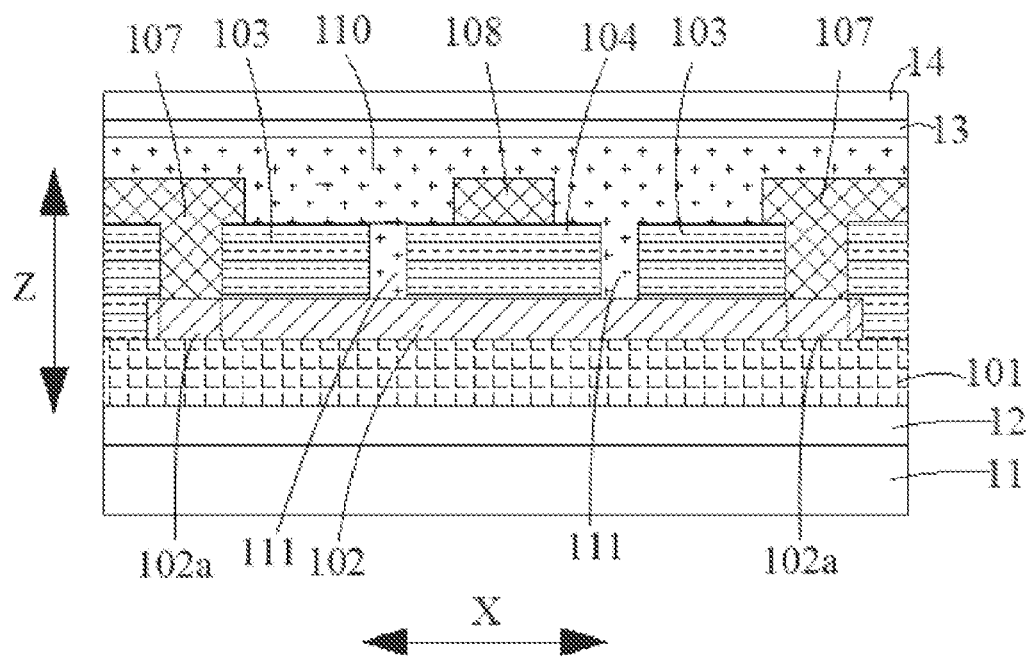
FIG. 10 shows a schematic cross-sectional view of the partial structure of the display device according to an embodiment of the present disclosure.

4, FIG. 6, FIG. 9 and FIG. 10 do not have practical significance (for example, do not represent the boundary of a hole, etc.), that is, it does not exist in the actual product, it is just to indicate which area in the conductive bridge 102 is the bridging position 102a, so as to facilitate others to understand.

The insulating support portion is formed on the one side of the substrate 101 and is provided on the conductive bridge 102. In detail, the insulating support portion may include a plurality of first support portions 103 arranged at intervals in the first direction X and a second support portion 104 located between adjacent first support portions 103, wherein the first support portion 103 and the second supporting portion 104, which are adjacent, are separated from each other by at least one first partition opening 105.

FIG. 4 shows that the first support portion 103 and the second support portion 104 adjacent are separated by a first partition opening 105, but it should be understood that the number of the first partition openings 105 is not limited to one, and it may be more than one, depending on the needs. In addition, it should be noted, when only one first partition opening 105 is provided between the first support portion 103 and the second support portion 104, it means that there is no other insulating portion between the first support portion 103 and the second support portion 104. When a plurality of first partition openings 105 are provided between the first support portion 103 and the second support portion 104, it means that the first support portion 103 and the second support portion 104 may also include other insulating portions therebetween.

In some embodiments, the width of the first partition opening 105 may be less than or equal to 20 μm, such as, 5 μm, 10 μm, 15 μm, 20 μm, etc.; and the depth of the first partition opening 105 may be 1 μm to 5 μm, such as, 1 μm, 2 μm, 3 μm, 4 μm, 5 μm and so on.

It should be noted that the width is the size in the first direction X, and the depth is the size in the Z direction, as shown in FIG. 4.

As shown in FIGS. 2 and 4, each first supporting portion 103 corresponds to a bridging position 102a, and the first supporting portion 103 has a via hole 106 exposing the bridging position 102a.

The touch electrode portion includes a plurality of first touch electrodes 107 arranged at intervals in the first direction X and a second touch electrode 108 located between adjacent first touch electrodes 107. The first touch electrode 107 is insulated from the second touch electrode 108. Each first touch electrode 107 is formed on a first supporting portion 103 and is electrically connected to the bridging position 102a through the via hole 106, and each second touch electrode 108 is formed on the second support portion 104.

Optionally, the first touch electrode 107 and the second touch electrode 108 can be arranged in the same layer, and the adjacent first touch electrode 107 and second touch electrode 108 are separated from each other by at least one second partition opening 109 to achieve mutual insulation between the first touch electrode 107 and the second touch electrode 108.

FIG. 4 shows that the adjacent first touch electrode 107 and second touch electrode 108 are separated by a second partition opening 109, but it should be understood that the number of the second partition opening 109 is not limited to one, and may be more than one, depending on the needs. In addition, it should be noted that when only one second partition opening 109 is provided between the first touch electrode 107 and the second touch electrode 108, it means that there is no other conductive part between the first touch electrode 107 and the second touch electrode 108; when a plurality of second partition openings 109 are provided between the first touch electrode 107 and the second touch electrode 108, it means that there are other conductive parts between the first touch electrode 107 and the second touch electrode 108.

In the present disclosure, unless otherwise specified, the term "arranged in the same layer" means that two layers, parts, components, elements or portions can be formed through one patterning process, and the two layers, parts, components, elements or portions are generally formed of the same material.

But not limited to this, the first touch electrode 107 and the second touch electrode 108 may also be located in different layers and insulated from each other by an insulating material, that is, the first touch electrode 107 and the second touch electrode 108 can be formed by different patterning processes.

In the embodiments of the present disclosure, by opening the first partition opening 105 on the insulating support portion, the internal stress generated by the insulating support portion can be released at the first partition opening 105 during the bending process of the touch module 10, in order to avoid excessive internal stress accumulation, alleviating the situation that the bridging position 102a is broken due to excessive internal stress of the insulating support portion, and then may ensure that the touch module 10 still has a good touch performance in the bent state, which improves the yield of the touch module 10.

Figure 5:
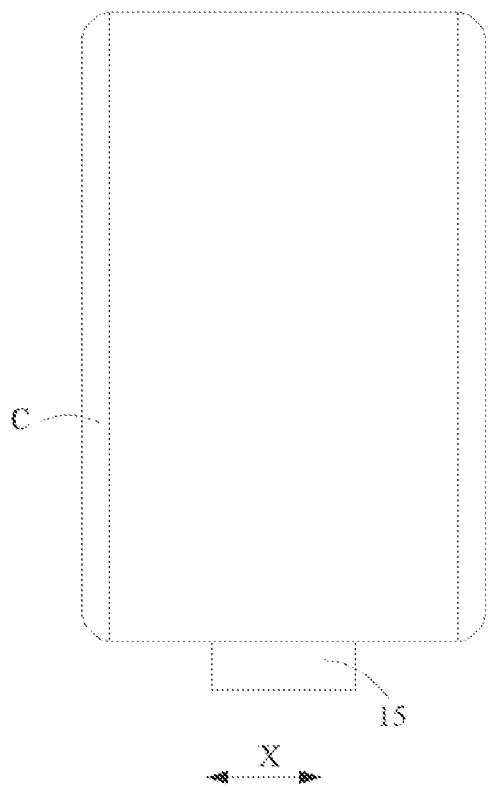
FIG. 5 shows a schematic top view of a display device according to an embodiment of the present disclosure.

Among them, since the touch module 10 has a good bending performance and touch performance, the touch module 10 can be used in a display device having a larger bending angle (for example, a bending angle of the binding area C shown in FIG. 5 is 90°), and the use range of the touch module 10 is expanded.

In addition, in this embodiment, the first partition opening 105 on the insulating support portion and its via hole 106 can be formed by one patterning process; it should be understood that the "patterning process" generally includes photoresist coating, exposure, development, etching, photoresist stripping and other steps; "one patterning process" refers to the process of using a mask to form a patterned layer, part, component, etc.; that is, in this embodiment, when making the first partition opening 105, there is no need to increase the number of masks, thereby not increasing development costs. Since the first partition opening 105 is opened between the part for supporting the first touch electrode 107 and the part for supporting the second touch electrode 108, the design of the first partition opening 105 will not affect the structures of the first touch electrode 107 and the second touch electrode 108, and may ensure the touch effect.

It should be noted that the pattern of the aforementioned insulating support portion may be basically similar to the pattern of the touch electrode portion.

In an embodiment of the present disclosure, one of the first touch electrode 107 and the second touch electrode 108 is a transmitting electrode, and the other is a receiving electrode. Optionally, the first touch electrode 107 is a transmitting (TX) electrode, and the second touch electrode 108 is a receiving (RX) electrode, that is, the touch module 10 can be a mutual capacitive touch module 10.

It should be understood that there should be a plurality groups of touch patterns in the touch module 10. As shown in FIG. 2, the plurality groups of touch patterns are arranged in a second direction Y, which intersects the first direction X. Optionally, the second direction Y is orthogonal to the first direction X. The first touch electrodes 107 corresponding to each other in the second direction Y in the plurality groups of touch patterns are disconnected from each other; each first touch electrode 107 connected through the conductive bridge 102 in each group of touch patterns may form one channel. For example, when the first touch electrode 107 is a transmitting electrode, this channel may be a TX channel. The second touch electrodes 108 corresponding to each other in the second direction Y in the plurality groups of touch patterns are connected, that is, a plurality of second touch electrodes 108 corresponding to each other and connected with each other in the second direction Y may form another channel. For example, when the second touch electrodes 108 are receiving electrodes, this channel may be an RX channel.

That is to say, the touch module 10 of the present disclosure may include a plurality of TX channels arranged at intervals in the second direction Y, and a plurality of RX channels arranged at intervals in the first direction X, wherein the orthographic projections of the RX channels and the TX channels on the substrate 101 intersects to form a grid shape. The intersection of the RX channel and the TX channel will form a capacitor. This design may reduce the number of channels while achieving multi-touch and no ghost points, improving the accuracy of touch.

Optionally, the corresponding first support portions 103 in the second direction Y in the plurality groups of touch patterns are disconnected from each other; the corresponding second support portions 104 in the second direction Y in the plurality groups of touch patterns are connected with each other. That is to say, in the entire touch module 10, the orthographic projection pattern of the layer, where the insulating support layer is located, on the substrate 101 may be basically similar as the orthographic projection pattern of the layer, where the touch electrode portion is located, on the substrate 101, and they are all grid-shaped. Thus, while ensuring the support stability of the layer where the insulating support portion is located, it can also alleviate the situation that the bridging position 102a is broken due to excessive stress in the insulating support portion, thereby ensuring the touch module 10 still has a good touch performance in the bent state, which improves the yield of the touch module 10.

In an embodiment of the present disclosure, as shown in FIG. 2, the conductive bridge 102 in each group of touch patterns may be provided in multiple, the plurality of conductive bridges 102 are arranged at intervals in the first direction X, and each conductive bridge 102 has two bridging positions 102a, that is, each conductive bridge 102 may realize the connection between the adjacent first touch electrodes 107 in the first direction X; this design realizes the connection of the first touch electrodes 107, at the same time, it can also prevent the conductive bridge from being broken due to excessive stress accumulation in the first direction X during the bending process, thereby avoiding such a case that a certain part of the conductive bridge 102 is broken during the bending process, causing all other touch positions in the entire first direction X fail.

But not limited to this, each group of touch patterns may also include only one conductive bridge 102 extending in the first direction X, and each first touch electrode 107 in each group of touch patterns is connected through the one conductive bridge 102 in order to form one touch channel, the details of which need to be set according to actual needs.

It should be noted, taking a mobile phone as an example of the display device, as shown in FIG. 5, the binding area C of the mobile phone is usually set on both sides of the short side direction, and the binding area C of the cover 14 can be bent at an angle 90°, that is, the display screen of the mobile phone can be a waterfall screen. In this case, if the touch module 10 is attached to the cover plate 14, in order to better alleviate the situation that the bridging position 102a is broken caused by excessive stress in the insulating support portion, the first direction X of the present disclosure can be the short side direction of the mobile phone, so as to ensure that the touch module 10 still has a good touch performance in the bent state, and the yield of the touch module 10 is improved.

In an embodiment of the present disclosure, as shown in FIG. 2, the contour line of the orthographic projection of the first touch electrode 107 on the substrate 101 is located inside the contour line of the orthographic projection of the first support portion 103 on the substrate 101; and the contour line of the orthographic projection of the second touch electrode 108 on the substrate 101 is located inside the contour line of the orthographic projection of the second support portion 104 on the substrate 101, so that the design is convenient to align the mask plate in the patterning process of the touch electrode portion, thereby ensuring a production accuracy and then a good touch performance.

Wherein, the orthographic projections of the first touch electrodes 107 and the second touch electrodes 108 on the substrate 101 may be in a grid shape, so that during the bending process of the touch module 10, the internal stress generated by the touch electrodes may be better released, thereby avoiding the breakage of the touch electrode portion, and ensuring the stability of the touch performance; in addition, it is also convenient to improve the flexibility of the touch electrode portion, so as to improve the flexibility of the overall touch module 10, such that the touch module 10 may have a good bending ability, and is suitable to be used in a display device with a larger bending angle (for example, the bending angle of the binding area C is 90°), and the use scope of the touch module 10 is enlarged.

In the same way, the orthographic projections of the first support portions 103 and the second support portions 104 on the substrate 101 may be in a grid shape, so that during the bending process of the touch module 10, the internal stress generated by the insulating support portion can be better released, thereby avoiding the bridging position 102a from being broken, and ensuring the stability of the touch performance; in addition, the flexibility of the entire touch module 10 may be further improved, so that the touch module 10 has a good bending ability, and the use scope of the touch module 10 is enlarged.

Optionally, the line width of the grid lines in the first touch electrodes 107 and the second touch electrodes 108 may be 1 μm to 10 μm, so as to improve the bendability of the touch electrode portion while ensuring the conductivity.

The materials of the first touch electrode 107, the second touch electrode 108, and the conductive bridge 102 can be metal materials, such as silver, copper and other metal materials, so that they may have good conductivity and can improve the touch sensitivity of the entire touch module 10.

In some embodiments, as shown in FIG. 6, each group of touch patterns may further include a filling portion 111, and the filling portion 111 is filled in the first partition opening 105. Wherein, in order to ensure that the first partition opening 105 still has a good stress relief ability, the materials of the filling portion 111 and the insulating support portion may be different to avoid bonding force generated between the filling portion 111 and the insulating support portion located in the first partition opening 105. In other words, the filling portion 111 located in the first partition opening 105 is only in contact with the insulating support portion, and during the bending process, a gap is generated between the filling portion 111 located at the first partition opening 105 and the insulating support portion, and the stress can still be released to avoid excessive stress accumulation in the insulating support portion, which may relieve the bridging position 102a from being broken due to excessive stress in the insulating support portion, thereby ensuring that the touch module 10 still has a good touch performance in the bent state, which improves the yield of the touch module 10.

Optionally, the material of the insulating support portion can be an inorganic material, and the inorganic material may be silicon oxide, silicon nitride, etc.; wherein, the inorganic insulating material can be processed by CVD (Chemical Vapor Deposition) etc., on the substrate 101 and apply one patterning process to form an insulating support portion; and the material of the filling portion 111 may be an organic material, specifically an organic insulating material, such as PI (Polyimide) etc., to avoid false touches between the filling portion 111 and the first touch electrode 107 and the second touch electrode 108 during the bending process.

In an embodiment, the insulating support portion is made of inorganic materials to ensure the strength and the support stability of the insulating support portion. In addition, the bonding strength of the touch electrode and the insulating support portion can be ensured, thereby ensuring the touch stability. The filling portion 111 is made of organic materials, which can improve the flexibility of the filling portion 111, so that even if the filling portion 111 is located in the first partition opening 105, it has a good flexibility, and can be used for the insulating support portion. The internal stress generated during the bending process may be absorbed, thereby avoiding excessive stress accumulation in the insulating support portion, and alleviating the situation that the bridging position 102a is broken due to excessive stress in the insulating support portion, thereby ensuring that the touch module 10 still has good touch performance in the bending state, which improves the yield of the touch module 10.

In some embodiments, as shown in FIG. 6, each set of touch patterns may further include an insulating protection portion 110, which covers the touch electrode portion and the filling portion 111. The first touch electrode 107 and the second touch electrode 108 in the touch electrode portion may be protected by providing the insulating protection portion 110 to avoid damage caused by collision with structures in the external environment, and the structural stability of the touch module 10 is improved.

Optionally, the material of the insulating protection portion 110 may be an inorganic material, such as silicon oxide, silicon nitride, etc., or an organic material, such as PI (Polyimide). Preferably, the material of the insulating protection portion 110 is the same as the material of the filling portion 111, so that the filling portion 111 and the insulating protection portion 110 may be manufactured at the same time, that is, the insulating protection portion 110 and the filling portion 111 can be integrally formed to reduce processing difficulty.

Figure 7:
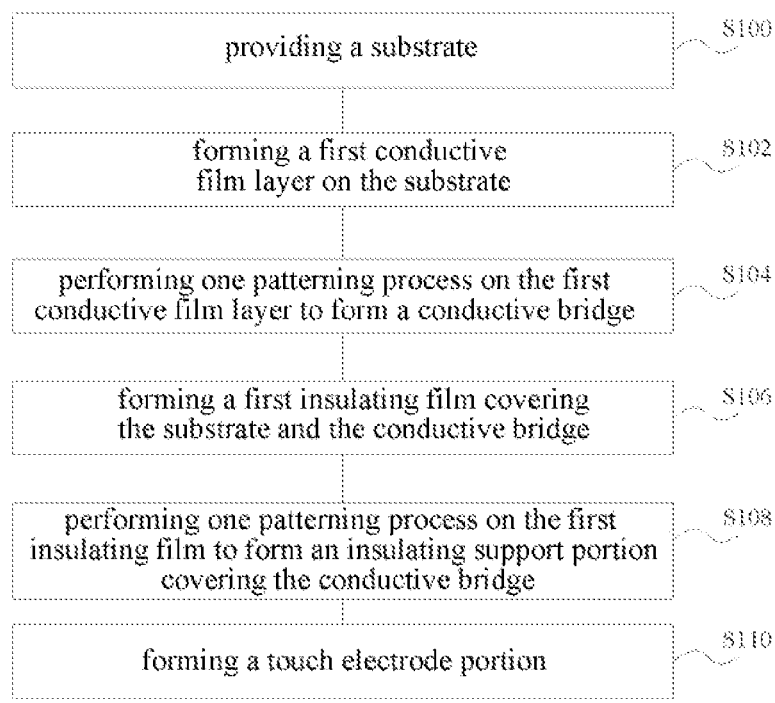
FIG. 7 shows a flow chart of a manufacturing method of the touch module according to an embodiment of the present disclosure.
Figure 8:
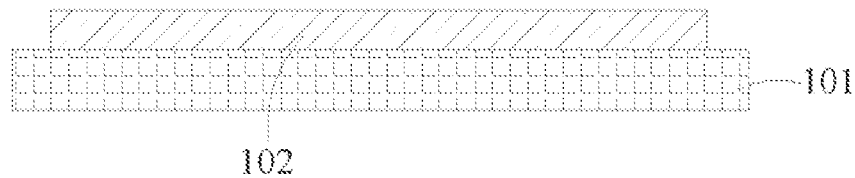
FIG. 8 shows a schematic structural diagram after step S104 is completed.

The embodiments of the present disclosure also provide a method for manufacturing a touch module. The structure of the touch module can be the touch module 10 described in the foregoing embodiments, and will not be described in detail here. As shown in FIG. 7, the manufacturing method may include:

Step S100, providing a substrate 101;

Step S102, forming a first conductive film layer on the substrate 101; for example, a metal material such as Ag or Cu may be formed on the substrate 101 by evaporation or magnetron sputtering to form the first conductive film layer;

Step S104, performing one patterning process on the first conductive film layer to form a conductive bridge 102, as shown in FIG. 8, the conductive bridge 102 having a plurality of bridging positions 102a arranged at intervals in the first direction X (as shown in FIG. 9);

Step S106, forming a first insulating film covering the substrate 101 and the conductive bridge 102; for example, depositing an inorganic insulating material on the substrate 101 and the conductive bridge 102 by CVD, etc.;

Step S108, performing one patterning process on the first insulating film to form an insulating support portion covering the conductive bridge 102. As shown in FIG. 9, the insulating support portion includes a plurality of first support portion 103 spaced apart in the first direction X, a second support portion 104 located between adjacent first support portions 103, and a first partition opening 105 located between the first support portion 103 and the second support portion 104; each first support portion 103 corresponds to one bridging position 102a and the first supporting portion 103 has a via hole 106 exposing the bridging position 102a;

In step S110, forming a touch electrode portion. As shown in FIG. 4, the touch electrode portion includes a plurality of first touch electrodes 107 arranged at intervals in the first direction X, a second touch electrode 108 located between adjacent first touch electrodes 107 and a second partition opening 109 between the first touch electrodes 107 and the second touch electrode 108; each first touch electrode 107 is formed on the first support portion 103 and is electrically connected to the bridging position 102a through a via hole 106, and each second touch electrode 108 is formed on the second supporting portion 104; for example, a metal material such as Ag or Cu can be formed on the substrate 101 by magnetron sputtering, and a touch electrode portion is formed by using one patterning process.

The specific structures and beneficial effects of the conductive bridge 102, the insulating support portion, and the touch electrode portion in the manufacturing method of the embodiment of the present disclosure have been described in the embodiments of the touch module 10 above, and will not be repeated here.

In an embodiment of the present disclosure, the manufacturing method may further include forming a filling portion 111 filled in the first partition opening 105 and an insulating protection portion 110 covering the touch electrode portion and the filling portion 111. As shown in FIG. 6, the insulating protection portion 110 may be made of organic insulating materials.

It should be noted that although the various steps of the method in the present disclosure are described in a specific order in the drawings, this does not require or imply that these steps must be performed in the specific order, or that all the steps shown must be performed to achieve the desired result. Additionally or alternatively, some steps may be omitted, multiple steps may be combined into one step for execution, and/or one step may be decomposed into multiple steps for execution, etc.

An embodiment of the present disclosure also provides a display device, as shown in FIG. 5 and FIG. 10, which includes a display module and the touch module 10 described in any of the foregoing embodiments. The substrate 101 may be formed on the display side of the display module. The display module can be an AMOLED display module, but it is not limited to this, depending on the specific situation. The display module of the present disclosure may include a display layer 11 and an encapsulation layer 12 located on the display side of the display layer 11, wherein the substrate 101 of the touch module 10 may be disposed on a side of the encapsulation layer 12 away from the display layer 11.

According to the embodiments of the present disclosure, the specific type of the display device is not particularly limited. The types of display devices commonly used in the field can be used, such as AMOLED displays, mobile devices such as mobile phones, wearable devices such as watches, VR devices, etc. Those skilled in the art can make a corresponding selection according to the specific purpose of the display device, which will not be repeated here.

It should be noted that, in addition to the array substrate and the integrated circuit board, the display device also includes other necessary components and parts. Take the display as an example, as shown in FIG. 5 and FIG. 10. Specifically, for example, a glass cover 14, a polarizer 13 located between the touch module 10 and the glass cover 14, a flexible circuit board 15, a housing, a power cord, etc. Those skilled in the art may add accordingly in accordance with the specific requirements of the display device in the field, and will not be repeated here.

Although relative terms such as "upper" and "lower" are used in this specification to describe the relative relationship of one component of an icon to another, these terms are used in this specification only for convenience, for example, according to the exemplary direction described the drawings. It can be understood that if the device of the icon is turned over and turned upside down, the components described as "upper" will become the "lower" components. When a structure is "on" another structure, it may mean that a certain structure is integrally formed on other structures, or that a certain structure is "directly" installed on other structures, or that a certain structure is "indirectly" installed on other structures through another structure.

The terms "a", "an", "the", "said" and "at least one" are used to indicate the presence of one or more elements/components/etc.; the terms "include" and "comprise" are used to indicate open-ended inclusive means and means that there may be additional elements/components/etc. in addition to the listed elements/components/etc.

Those skilled in the art will easily think of other embodiments of the present disclosure after considering the description and practicing the invention disclosed herein. The present disclosure is intended to cover any variations, uses, or adaptive changes of the present disclosure. These variations, uses, or adaptive changes follow the general principles of the present disclosure and include common knowledge or conventional technical means in the technical field that are not disclosed in the present disclosure. The description and the embodiments are only regarded as exemplary, and the true scope and spirit of the present disclosure are pointed out by the appended claims.

What is claimed is:

1. A touch module, comprising: a substrate and at least one group of touch patterns, each group of touch patterns comprising:
    a conductive bridge, formed on one side of the substrate and having a plurality of bridging positions arranged at intervals in a first direction;
    an insulating support portion, formed on the one side of the substrate and provided on the conductive bridge, the insulating support portion comprising a plurality of first support portions arranged at intervals in the first direction, and a second support portion located between adjacent first support portions, the first support portion and the second support portion adjacent being separated from each other by at least one first partition opening, each of the first support portions corresponds to one of the bridging positions, and the first supporting portion has a via hole exposing the bridging position; and
    a touch electrode portion, comprising a plurality of first touch electrodes arranged at intervals in the first direction, and a second touch electrode located between adjacent first touch electrodes and insulated from the first touch electrodes, each of the first touch electrodes being formed on one of the first support portions and electrically connected to the bridging position through the via hole, and each of the second touch electrodes is formed on the second support portion.

2. The touch module of claim 1, wherein,
    the first touch electrodes and the second touch electrode(s) are arranged in a same layer, and the first touch electrode and the second touch electrode adjacent are separated from each other by at least one second partition opening.

3. The touch module of claim 1, wherein,
    a contour line of an orthographic projection of the first touch electrode on the substrate is located inside a contour line of an orthographic projection of the first support portion on the substrate; and
    a contour line of an orthographic projection of the second touch electrode on the substrate is located inside a contour line of an orthographic projection of the second support portion on the substrate.

4. The touch module of claim 3, wherein,
    the orthographic projections of the first touch electrodes and the second touch electrode(s) on the substrate are in a grid shape; and the orthographic projections of the first support portions and the second support portion(s) on the substrate are in a grid shape.

5. The touch module of claim 1, wherein,
    a width of the first partition opening is less than or equal to 20 μm, and a depth of the first partition opening is 1 μm to 5 μm.

6. The touch module of claim 1, wherein each group of touch patterns further comprises a filling portion, and the filling portion is filled in the first partition opening.

7. The touch module of claim 6, wherein a material of the filling portion is an organic material, and a material of the insulating support portion is an inorganic material.

8. The touch module of claim 6, wherein each group of touch patterns further comprises an insulating protection portion, and the insulating protection portion covers the touch electrode portion and the filling portion.

9. The touch module of claim 1, wherein,
    a plurality of conductive bridges are provided in each group of touch patterns, and the plurality of conductive bridges are arranged at intervals in the first direction, and each of the conductive bridges has two connection regions.

10. The touch module of claim 1, wherein,
    the touch patterns are provided in multiple groups, and the multiple groups of touch patterns are arranged in a second direction, and the second direction intersects the first direction; wherein,
    the plurality groups of touch patterns are disconnected from each other at a position between the corresponding first touch electrodes in the second direction; and
    the plurality groups of touch patterns are connected with each other at a position between the corresponding second touch electrodes in the second direction.

11. The touch module of claim 10, wherein,
the plurality groups of touch patterns are disconnected from each other at a position between the corresponding first support portions in the second direction; and
the plurality groups of touch patterns are connected with each other at a position between the corresponding second support portions in the second direction.

12. A display device, comprising a display module and a touch module according to claim 1, a substrate of the touch module being formed on a display side of the display module.

13. A display device, comprising a display module and a touch module according to claim 2, a substrate of the touch module being formed on a display side of the display module.

14. A display device, comprising a display module and a touch module according to claim 3, a substrate of the touch module being formed on a display side of the display module.

15. A display device, comprising a display module and a touch module according to claim 4, a substrate of the touch module being formed on a display side of the display module.

16. A display device, comprising a display module and a touch module according to claim 5, a substrate of the touch module being formed on a display side of the display module.

17. A display device, comprising a display module and a touch module according to claim 6, a substrate of the touch module being formed on a display side of the display module.

18. A display device, comprising a display module and a touch module according to claim 7, a substrate of the touch module being formed on a display side of the display module.

19. A display device, comprising a display module and a touch module according to claim 8, a substrate of the touch module being formed on a display side of the display module.

20. A display device, comprising a display module and a touch module according to claim 9, a substrate of the touch module being formed on a display side of the display module.

* * * * *